United States Patent [19]

Schlademan

[11] 4,359,492

[45] Nov. 16, 1982

[54] COATING WITH DUSTING AGENTS IN PELLETIZING TACKY ELASTOMERIC MATERIALS

[75] Inventor: James A. Schlademan, West Chester, Pa.

[73] Assignee: Atlantic Richfield Company, Los Angeles, Calif.

[21] Appl. No.: 243,328

[22] Filed: Mar. 13, 1981

[51] Int. Cl.³ .................... C08L 93/00; B05D 7/00
[52] U.S. Cl. .................. 427/222; 528/491; 528/497; 528/498; 524/274; 83/922; 427/180; 427/195; 525/97; 525/98
[58] Field of Search ............ 525/97, 98; 528/491, 528/497, 498; 260/27 BB; 427/180, 195, 222; 524/274

[56] References Cited

U.S. PATENT DOCUMENTS

T982,004   5/1979  Klensendorf et al.
2,895,939  7/1959  Stober et al. .................. 427/180
3,359,128  12/1967 Humphrey et al. ............ 427/180
3,446,642  5/1969  Webb ............................ 427/195
4,024,312  5/1977  Korpman ...................... 428/343
4,101,484  7/1978  Doss ............................. 260/27 BB
4,271,213  6/1981  Grimm et al. ................. 260/816 G Primary Examiner—H. S. Cockeram
Attorney, Agent, or Firm—Lewis J. Young

[57] ABSTRACT

Thermoplastic elastomers useful in formulating certain pressure-sensitive hot-melt adhesives are normally very tacky and thus are hard to handle. The present invention relates to a method of eliminating problems due to this tackiness by dusting the elastomer pellets with a friable polymer resin having a ring and ball softening point of at least 95° C. Selection of a polymer resin which is normally used in adhesive formulations allows one to overcome tackiness without having detrimental effects on the ultimate adhesive properties of formulations based on the elastomer.

3 Claims, No Drawings

COATING WITH DUSTING AGENTS IN PELLETIZING TACKY ELASTOMERIC MATERIALS

BACKGROUND OF THE INVENTION

The present invention relates to the field of hot melt adhesive formulations based on thermoplastic elastomers, which elastomers by their nature are inherently tacky and non-free flowing.

Adhesive compositions using many of the base elastomers, tackifier resins and reinforcing resins are described in U.S. Pat. No. 4,024,312 for use in adhesive tape applications.

U.S. Pat. No. 4,101,484 teaches a formulation for a sealant which has good flexibility and adhesion, but is not tacky after curing.

Many of the base elastomers used in formulating adhesives are inherently tacky and their recovery from the manufacturing process in the form of usable pellets is extremely difficult. Recovery by devolatilizing extrusion into polymer strands which are then put through a pelletizing machine results in tacky strands which cannot be chopped into pellets without gumming up the machinery and without producing a product which is anything but free-flowing.

One method of overcoming the gumming problem has been to cool the extruded strand of elastomer prior to attempting to chop the strand. Some degree of success has been found with this procedure, but once the pellets warm up to room temperature, they become sticky again and stick to one another and to everything they touch.

SUMMARY OF THE INVENTION

It has now been found that the sticky strands of thermoplastic elastomer can be made non-tacky and readily pelletizable by dusting the surface of the strands with a friable polymer resin having a ring and ball softening point of at least 95° C. The resulting strands can be easily chopped in conventional pelletizing machinery and the resulting pellets remain separate and free-flowing.

DESCRIPTION OF THE PREFERRED EMBODIMENT

The present invention relates to a method for preparing free-flowing elastomer pellets from normally tacky polymers. A large class of normally tacky polymers is that used in adhesive formulations for pressure-sensitive hot-melt adhesives based on thermoplastic elastomers.

One type of adhesive formulation comprises the base elastomer, a tackifier resin, a reinforcing resin, a plasticizer and one or more stabilizers.

The base elastomer or resin may be a block copolymer of, for example, styrene and isoprene. The block copolymer may be either a linear di- or triblock or a starblock copolymer. Isoprene is preferred over butadiene because the isoprene gives greater tackiness, and hence adhesive quality, to the final adhesive compound.

When the base elastomer is itself extremely tacky, then its use in pellet form is very difficult because the pellets stick together and to everything they contact. The present invention eliminates this problem by dusting the surface of polymer strands prior to pelletizing. The dusting agents are friable polymer resins which are normally used in adhesive compounds and hence will not deleteriously affect the adhesive properties of any formulation in which the pellets are incorporated. The amount of dusting agent used varies with the surface area of the polymer strands to be coated, but does not exceed 2% by weight based on base elastomer.

It is known to dust tacky particles with various inorganic fillers such as calcium carbonate, aluminum silicate, clay, talc, kaolin, barytes, mica, silica, etc. However, in the case of hot melt adhesives, the presence of these inorganic fillers has an adverse effect on tack, aging and heat stability of the final adhesive compound. These effects are due to the insolubility of the fillers in the elastomer melt. Similarly, the use of certain polymeric compositions, such as waxy polyolefins is known. These tend to bleed to the surface or blush and, thus, effect the properties adversely.

The friable polymers useful as dusting agents in the present invention are those normally used in the compounding of adhesives based on thermoplastic elastomers. The friable resins have a ball and ring softening point of at least 95° C., as determined by ASTM-D36. The choice of friable resins normally used in compounding adhesives was made to eliminate, or at least minimize, adverse effects of the dusting agent on the ultimate adhesive properties.

Such polymeric resins normally used in compounding adhesives are comprised of two main groups—tackifier resins and reinforcing resins.

The tackifier resins are those resins which associate with the rubbery portions of the base adhesive elastomer. These are the rosins, rosin derivatives (especially the ester derivatives), polyterpene resins and aliphatic hydrocarbon resins (such as polypiperylene). They are used in amounts up to 300 parts per hundred parts of elastomer.

The reinforcing resins are those resins which associate with the polystyrene domains of the base elastomer. They are used in amounts of up to 80 parts per hundred parts of elastomer, depending on the desired effect.

These are normally hard polystyrene phase modifier resins, including aromatic hydrocarbon resins, low molecular weight resinous polymers of styrene, vinyltoluene, α-methylstyrene, indene and copolymers of these with each other and with other polymerizable comonomers. Such copolymers are, for example, indene-coumarone resins, styrene-maleic anhydride resins and styrene-vinyltoluene resins.

The plasticizers may be any of the known ester, phosphate, paraffin or hydrocarbon type plasticizers, including low melting poly-1-butenes, high viscosity motor oils, etc. Up to 80 parts per hundred parts of elastomer of plasticizer may commonly be used.

Stabilizers, if used, are used in amounts of up to 5 parts per hundred parts of elastomer.

EXAMPLE

A tacky styrene-isoprene block copolymer consisting of 15% by weight styrene and 85% by weight isoprene was extruded into strands of about ⅛" diameter. Attempts to chop this strand in a paper cutter (to simulate a Cumberland Chopper or similar device) resulted in pellets which stuck to everything, including each other.

The strands of the tacky polymer were coated by being dusted with a powder made by pulverizing a poly-α-methylstyrene resin having a ball and ring softening point of 141° C. The dusted strands contained less than 2% by weight of the resin and were chopped in a paper cutter, as before, to form free-flowing pellets which showed no tendency to stick together or agglomerate even after standing several days. Because the α-methylstyrene resin used is one normally added to adhesive compositions as a reinforcing agent, the small amount added to the tacky polymer pellets did not adversely affect the adhesive properties of an adhesive formulation made from the dusted pellets.

Similar, but slightly less effective, results were obtained by dusting the strands of tacky polymer with powdered polyterpene resin having a softening point of about 95° C.

I claim:

1. A method of preparing free-flowing elastomeric polymer pellets consisting essentially of coating the surface of a strand of normally tacky elastomeric polymer with up to 2% by weight of a dusting agent and then cutting the strands into pellets; said dusting agent consisting of a friable polymer having a ball and ring softening point of at least 95° C. and normally used in compounding of adhesives based on said elastomeric polymer, whereby the dusting agent does not interfere with the normal use of the pellets in adhesive formulations.

2. The method of claim 1 wherein the friable polymer is a tackifier resin selected from the group consisting of rosin, rosin derivatives, polyterpene resins and aliphatic hydrocarbon resins.

3. The method of claim 1 wherein the friable polymer is a reinforcing resin selected from the group consisting of aromatic hydrocarbon resins, low molecular weight resinous polymers of vinyltoluene, α-methylstyrene, styrene, indene and copolymers of these with each other and with other polymerizable comonomers.

* * * * *